(12) United States Patent
Agaon

(10) Patent No.: US 11,734,356 B2
(45) Date of Patent: Aug. 22, 2023

(54) SYSTEM AND METHOD FOR IMPLEMENTING AN OPEN POLICY AGENT BRIDGE

(71) Applicant: JPMorgan Chase Bank, N.A., New York, NY (US)

(72) Inventor: Michael Agaon, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 299 days.

(21) Appl. No.: 17/018,134

(22) Filed: Sep. 11, 2020

(65) Prior Publication Data

US 2022/0083602 A1    Mar. 17, 2022

(51) Int. Cl.
*G06F 30/00* (2020.01)
*G06F 16/9035* (2019.01)
*G06F 16/9038* (2019.01)
*G06F 30/17* (2020.01)
*G06Q 50/18* (2012.01)

(52) U.S. Cl.
CPC ...... *G06F 16/9035* (2019.01); *G06F 16/9038* (2019.01); *G06Q 50/184* (2013.01)

(58) Field of Classification Search
None
See application file for complete search history.

(56) References Cited

U.S. PATENT DOCUMENTS

| | | | | |
|---|---|---|---|---|
| 7,565,438 | B1* | 7/2009 | Zhu | H04L 63/10 709/219 |
| 8,256,010 | B2* | 8/2012 | Orlov | H04L 9/0836 380/278 |
| 8,850,507 | B2* | 9/2014 | Reisman | H04H 20/93 725/113 |
| 9,235,834 | B2* | 1/2016 | Bradley | H04L 63/0281 |
| 10,303,892 | B1* | 5/2019 | Lim | H04L 41/08 |
| 11,108,828 | B1* | 8/2021 | Curtis | H04L 63/20 |
| 2003/0078891 | A1* | 4/2003 | Capitant | H04N 21/4367 348/E7.056 |
| 2003/0225697 | A1* | 12/2003 | DeTreville | G06F 21/6218 705/51 |
| 2004/0024670 | A1* | 2/2004 | Valenzuela | G06F 21/10 705/35 |
| 2004/0220878 | A1* | 11/2004 | Lao | H04L 63/20 705/51 |
| 2008/0052311 | A1* | 2/2008 | Rangadass | G06Q 10/06 |

(Continued)

OTHER PUBLICATIONS

Guth, Susanne, Gustaf Neumann, and Mark Strembeck. "Experiences with the enforcement of access rights extracted from ODRL-based digital contracts." Proceedings of the 3rd ACM workshop on Digital rights management. 2003. (Year: 2003).*

(Continued)

*Primary Examiner* — Polina G Peach
(74) *Attorney, Agent, or Firm* — Greenblum & Bernstein, P.L.C.

(57) ABSTRACT

An embodiment of the present invention is directed to implementing an open policy agent bridge to entitlements determination as they relate to market data. According to an embodiment of the present invention, Open Policy Agent (OPA) may be implemented as a policy engine to make decisions and determinations concerning fine-grained access control for an application.

16 Claims, 2 Drawing Sheets

(56) References Cited

U.S. PATENT DOCUMENTS

| | | | |
|---|---|---|---|
| 2008/0066175 A1* | 3/2008 | Dillaway | G06F 21/6218 726/21 |
| 2008/0120240 A1* | 5/2008 | Ginter | G06Q 20/085 705/51 |
| 2009/0198697 A1* | 8/2009 | Bilger | G06F 21/6227 707/999.009 |
| 2013/0031596 A1* | 1/2013 | Becker | G06F 21/604 726/1 |
| 2014/0157370 A1* | 6/2014 | Plattner | G06F 21/6245 726/4 |
| 2014/0181003 A1* | 6/2014 | Kling | G06F 16/254 707/600 |
| 2014/0304836 A1* | 10/2014 | Velamoor | G06F 21/6209 726/28 |
| 2015/0310188 A1* | 10/2015 | Ford | H04L 63/0428 726/28 |
| 2017/0041296 A1* | 2/2017 | Ford | G06F 21/64 |
| 2017/0177836 A1* | 6/2017 | Stalker | H04W 4/80 |
| 2017/0331832 A1* | 11/2017 | Lander | H04L 63/102 |
| 2018/0026984 A1* | 1/2018 | Maker | H04L 63/102 726/4 |
| 2018/0096361 A1* | 4/2018 | Gilchrist | H04L 63/10 |
| 2019/0065771 A1* | 2/2019 | Seetharam | G06F 21/10 |
| 2021/0226774 A1* | 7/2021 | Padmanabhan | H04L 9/3239 |

OTHER PUBLICATIONS

U.S. Appl. No. 16/845,156, filed Apr. 2020, I. Slavin.
U.S. Appl. No. 16/904,156, filed Jun. 2020, I. Slavin.
U.S. Appl. No. 63/046,862, filed Jul. 2020, I. Slavin.
D. Preuveneers and W. Joosen, "Towards Multi-party Policy-based Access Control in Federations of Cloud and Edge Microservices," 2019 IEEE European Symposium on Security and Privacy Workshops (EuroS&PW), 2019, pp. 29-38, doi: 10.1109/EuroSPW.2019.00010. [retrieved on Nov. 3, 2011] Retrieved from the Intrernet: <https://lirias.kuleuven.be/retrieve/596638/, p. 2, col. 2, para. 2>.
International Searching Authority, International Search and Written Opinion, International Application No. PCT/US21/49445, dated Dec. 7, 2021, pp. 1-6.

* cited by examiner

US 11,734,356 B2

SYSTEM AND METHOD FOR IMPLEMENTING AN OPEN POLICY AGENT BRIDGE

FIELD OF THE INVENTION

The invention relates generally to a system and method for implementing an open policy agent bridge for fine-grained entitlement determinations.

BACKGROUND OF THE INVENTION

Large financial companies contribute a great deal of information to brokers for distribution. This information includes research reports, client statements, trade confirmations, responses to quotes, etc. One example of actively moving and varied category is market data. Data in this category may include index valuations, indicative quotes, reference data for new securities, indications of interest, etc. Information changes at a variable pace per financial security and can move quickly. Other changing data and data at rest may include research reports, reference data, etc.

Entities, such as financial institutions, are increasingly concerned with entitlements controls, methods of consumption, cross-company content sharing, dangers of disclosure, etc. Because the underlying data is sensitive, entities including financial institutions are not willing to entrust others with the full range of their data.

Market data is used and consumed by hundreds of applications and thousands of individual users through complex agreements with data vendors and Exchanges. For a large financial entity, it is common to have thousands of unique and individual agreements in force. Accordingly, there is a tremendous amount of contracts for market data where each contract can be unique in nature. Additional new rights may be negotiated and acquired through contracts.

Accordingly, it is difficult to ascertain an accurate and timely determination of entitlements as they relate to market data. Current solutions fail to provide a comprehensive approach to managing contracts. This results in lack of coordination between business support groups or lines of business.

These and other drawbacks exist.

SUMMARY OF THE INVENTION

According to one embodiment, the invention relates to a system that implements an open policy agent bridge for entitlements determination. The system comprises: an electronic input that interfaces with a user over a communication network; a first memory component that stores and manages Open Digital Rights Language (ODRL) data; a second memory component that stores and manages policy data; and a policy engine comprising a computer processor and coupled to the electronic input, the first memory and the second memory; the computer processor is further configured to perform the steps of: receiving, via a communication network, an entitlement query input associated with an object from a requestor wherein the object relates to a security object; responsive to the entitlement query input, extracting ODRL data corresponding to the object; extracting policy data based on digital rights management (DRM) corresponding to the object; generating, via the policy engine, an entitlement determination based on the ODRL data and the policy data; generating an entitlements query result; and transmitting, via a communication network, the entitlements query result to a recipient.

According to one embodiment, the invention relates to a method that implements an open policy agent bridge for entitlements determination. A method comprises the steps of: receiving, via a communication network, an entitlement query input associated with an object from a requestor wherein the object relates to a security object; responsive to the entitlement query input, extracting Open Digital Rights Language (ODRL) data corresponding to the object from a first memory component; extracting policy data based on digital rights management (DRM) corresponding to the object from a second memory component; generating, via a policy engine, an entitlement determination based on the ODRL data and the policy data; generating an entitlements query result; and transmitting, via a communication network, the entitlements query result to a recipient.

The innovative system may include a specially programmed computer system comprising one or more computer processors, interactive interfaces, electronic storage devices, and networks. The computer implemented system, method and medium described herein provide unique advantages to entities, organizations, market data consumers and other users, according to various embodiments of the invention. Current solutions provide contributors with limited controls (i.e., all or none) over what data is used in derivation and how. The innovative system provides transparency to otherwise restricted pricing and other market data. These and other advantages will be described more fully in the following detailed description.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
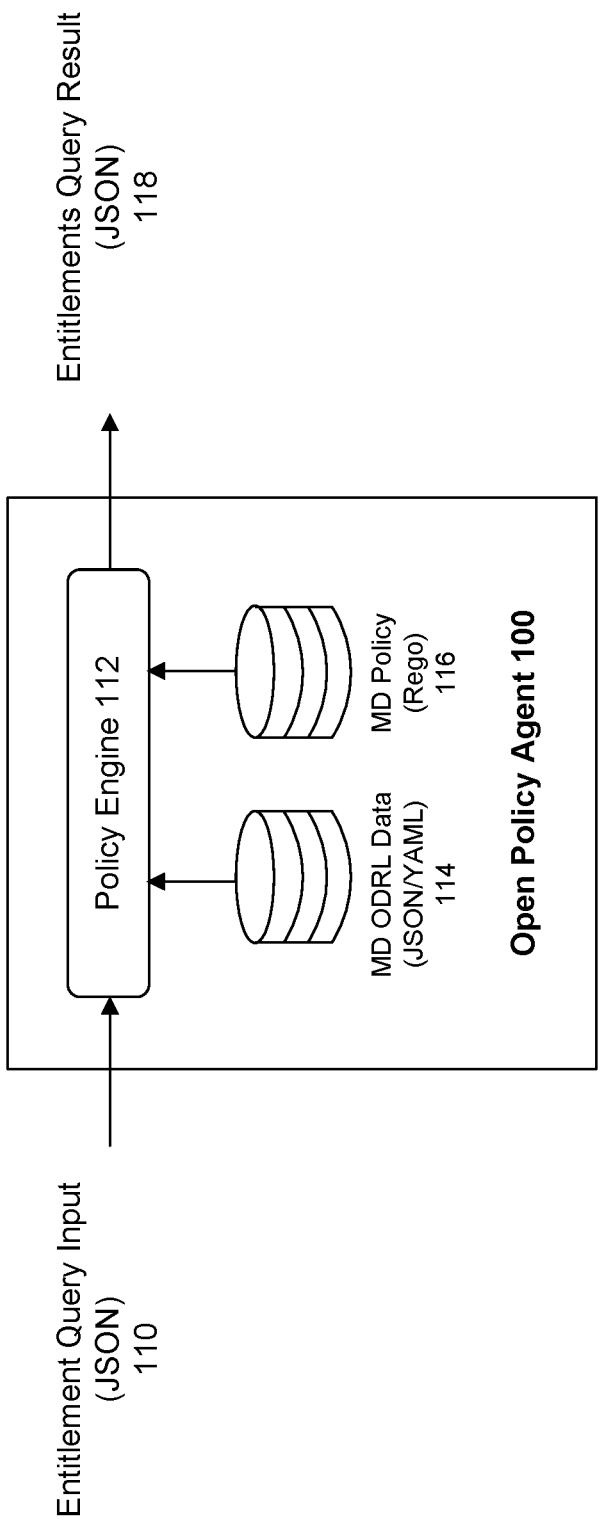
FIG. 1 is an exemplary system diagram, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to implementing an open policy agent bridge for entitlements determination relating to market data. According to an embodiment of the present invention, Open Policy Agent (OPA) may be implemented as a policy engine to make decisions and determinations concerning fine-grained access control for an object, application, etc. Open Policy Agent may represent a policy engine that provides a declarative language where policy is specified as code and APIs offload policy decision making from software. For example, OPA may be deployed as a standalone service along with server applications. This setup allows users to offload authorization decisions form server applications to OPA. The server applications may further implement the enforcement of those decisions. Other implementations and system architectures may be realized.

Digital Rights Management technologies, such as ODRL, allow content owners to maintain granular controls not only over what information is permitted to be used in derivation, regardless of location, but also providing a vehicle to specify terms that may be attached to the finished product (which may be in combination with other providers' terms). ODRI, represents Open Digital Rights Language which is a policy expression language that provides a flexible and interoperable information model, vocabulary, and encoding mechanisms for representing statements about the usage of content and services. ODRL is one exemplary application and other Rights Expression Languages (RELs) nay be applied in accordance with the various embodiments of the present invention.

An embodiment of the present invention may be implemented in a Market Data Hub by extending rights management of content to data providers. Market Data Hub may use a distributed ledger platform, such as a Quorum implementation of Blockchain. Quorum represents an enterprise-ready distributed ledger and smart contract platform. Quorum may be implemented for applications requiring processing of private transactions within permissioned participants. While the various embodiments of the present invention are described within the context of Quorum and Blockchain, other distributed ledger platforms, including other implementations of Blockchain and technologies may be implemented. Additional details concerning Market Data Hub are provided in U.S. patent application Ser. No. 16/845,156, filed Apr. 10, 2020, entitled "System and Method for Implementing A Market Data Hub via Distributed Ledger Technology," which claims priority to U.S. Provisional Application No. 62/833,019, filed Apr. 12, 2019, the contents of which are incorporated by reference herein in their entirety.

An embodiment of the present invention may be directed to generating and integrating digital rights language. For example, the system may generate a set of computer readable rights that describes certain characteristics of the contract. This may include what the contract actually users do, what the contract applies for, what are a user's restrictions, what are the obligations, etc. Additional details are provided in co-pending and commonly assigned patent applications titled "System and Method for Implementing Market Data Contract Analytics Tool," (U.S. Ser. No. 16/904,156, filed Jun. 17, 2020. and "System and Method for Implementing a Market Data Hub with Digital Rights Management," (U.S. Ser. No. 63/046,862, filed Jul. 1, 2020, the contents of which are incorporated by reference herein in their entirety.

An embodiment of the present invention makes determinations based on fine-grained entitlements of data as defined by data produces, for example. According to an embodiment of the present invention, entitlements may limit who can see the data or not see the data and then control the use of the data. For example, a data provider may specify that a security can be used for synthetic security generations, such as an index, a benchmark, or other algorithmically generated security. Data providers and other users may base actions, permission and/or restrictions on a specific security. For example, a user may specify rights associated with a particular security.

According to an exemplary illustration, a first financial institution may want to publish data into an index that another entity, such as an automated process inside Market Data Hub, may generate. A second financial institution may have a different set of requirements for which clients can see the information or how much they want to charge for the information (which may be different from what the first financial institution may want to charge).

For example, a data producer may provide a rich level of detail attached to a specific content, e.g., specific securities. Accordingly, with an embodiment of the present invention, a data producer may publish information and impose specific and granular entitlements on the information.

According to an embodiment of the present invention, entitlements-based market data may inform whether a specific user can key data for a particular trading on a Stock Exchange. This may be submitted as a query by a user. The query may invoke analysis on multiple dimensions to determine whether a specific user has access and whether the access is further limited in some manner. For example, a determination may consider how the information is to be used. This may be expressed as: what is the specific user going to use the information for once it is received. The answer may depend on an underlying contract and what the underlying contract allows users associated with an entity to do with the data. Also, the answer may further depend on whether the user is associated with an organization within the entity that has a special license to use the information that other general users do not. In addition, the user may be part of a group that is specifically excluded from a license to use the information. Other restrictions, privileges and limitations may be determined.

Accordingly, entitlements-based determinations may involve identifying who is trying to do what; what is the individual trying to use the information for, where does the individual sit within an organization tree, what type of policies exist for the particular object that is being entitled, etc. Based on such determinations, additional parameters, restrictions and obligations may be attached to this particular access. An embodiment of the present invention is directed to providing a sophisticated decision making process for entitlements-based objects.

An embodiment of the present invention is directed providing a bridge between entitlements-based determinations and open policy agent implementation to provide an entitlements enforcement framework. Based on digital rights management (DRM) data, an embodiment of the present invention applies policies to make determinations on whether a user is able to view, access and/or perform other actions relating to a particular data or object. The determination may further identify duties that the user is obligated to perform in accordance with the digital rights management. In addition, the digital rights management may relate to contractual data. The policies may provide a basis for enforcing and respecting the DRM and further performing the decision making.

An embodiment of the present invention is directed to making policy decisions based on three inputs: (1) Data; (2) Query Input and (3) Policy. The inputs to the policy engine may be obtained at run time. For example, the (1) Data and (3) Policy may be obtained at runtime from an upstream market data infrastructure. The (2) Query Input may be provided by a downstream processes. The bridge may further combine (1) Data and (2) Query Input into a single input. Once the (1) Data and (2) Query Input are combined, the policy engine may receive two inputs: Combined (1)(3) Data and Query Input and (2) Policy.

(1) Data may represent a set of facts about the outside world that OPA refers to while making a decision. For example, when controlling access based on an access control list, the data may include a list of users along with the permissions they were granted. That data may change over time and OPA may cache its latest state in memory. In this example, the data may be provided to OPA in a particular format, JSON format.

(2) Query Input may trigger a decision computation. The Query Input may specify the question that OPA should decide upon. The query input may be formatted as JSON. For example, a question may be represented as: "Is user 12345 allowed to subscribe for symbol Jxx.US?" A corresponding query input may contain a set of parameters including: u12345, subscribe, Jxx.US, and prod perm value.

(3) Policy may specify a computational logic. For example, a given data and a query input may yield a policy decision, e.g., a query result. The computational logic may be represented as a set of policy rules in the OPA's custom policy language. For example, the custom policy language may include Rego. Other declarative context aware languages may be applied. OPA may represent a policy engine that is able to interpret a policy. Policies may be created and provided to OPA as predefined policies. The policies may define rights that may be captured in the ODRL format. This may be used to make certain proper data licenses were acquired in order to be able to succeed on behalf of their business, and to help business entities confirm they are not licensing content they do not actually consume.

FIG. 1 is an exemplary system diagram, according to an embodiment of the present invention. As shown in FIG. 1, Policy Engine 112 may generate a policy decision responsive to three inputs (e.g., data 114, query input 110, and the policy 116). The output may be represented as an Entitlements Query Result 118. Query Results may vary depending on the policy and evaluation criteria. Results are not to particular additional objects. An exemplary output may include: Successful evaluation result including prohibitions and duties enlist prohibited actions and duties to abide):

```
{ "allowed": true }
{ "allowed":true, "prohibitions" : { ... } }
{ "allowed":true, "prohibitions" : { ... }, "duties":{ ... } }
```

Unsuccessful evaluation result with status. For example, status may provide and enlist the reasons for failure: {"allowed": false, "status": { . . . } }

Providing status of the denial represents a significant departure from prior approaches to evaluating entitlements. Existing system simply say "no" and users are then left to wonder why or call support.

Policy Engine 112 may receive an entitlement query input 110. The query input may be in JSON format. The query input may represent a query from a user. The query may relate to entitlement—whether data may be used in a particular manner or accessed by a certain user, for example. For example, a user may want to access data set. The query may relate to whether the user is allowed to access the data set. The query input may be in JSON format and originated by a user through an interface.

Policy Engine 112 may receive ODRL data 114. ODRL data may represent market data (MD). In this example, ODRL data may be in JSON/YAML format. ODRL data may be used to validate the query input. For example, ODRL may reflect whether a given user is eligible or not eligible to access the data set. ODRL reflects permissions, prohibitions, and duties for targeted data set(s).

Policy data 116 may be received in Rego. Rego may represent a rights expression language. Policy data may relate to market data. Policy Engine may then generate an entitlements query result. Policy Engine may interpret the rules included in the policy and based on the data and the query input makes a policy decision. The policy decision generated by the Policy Engine may be provided as a JSON document. For example, policy may be static data that has been developed and tested.

An embodiment of the present invention is directed to extracting one or more rules defined by an administrator. The rules may define how a user may access and/or interact with a particular security. The rules may also consider corporate structure, which may include a tree of personnel relations. This provides insights on how certain users (employees) fit within departments, desks, groups, etc. An embodiment of the present invention may further apply translation logic that receives rules and corporate structure data with ODRL description of the contract relevant to that particular entity and then merge it within the Open Policy Agent framework as input into the Rego policy.

An embodiment of the present invention may use the language to define rules to create translation metrics or matrix. Additional rules for ODRL permissions, prohibitions, and duties may be expressed in an interpreted language. These rules may be applied "as is" during entitlement determination.

An embodiment of the present invention may execute on a server or other processing component. The server may also send access logs to a central connection point, which may then disseminate the logs into respective storage infrastructure. The storage infrastructure may also implement firewalls and other types of security features in the environment.

An embodiment of the present invention may enforce duties to the entitlements, privileges and/or actions that a user could take on certain data. Duties may represent an obligation that is required once permission is given to consume the data. Duties may include reporting, e.g., providing information to a central unit. Reporting may involve identification and use of certain data. According to another example, an action of generating an index may require a notification to a provider. The notification may require a real-time communication in a specified format. According to yet another example, a duty may include providing a disclaimer if certain information is used for a particular function. In this example, a user may distribute a graph of performance of a security to be a benchmark for performance. If the user utilizes data to create a graph to distribute to customers outside the user's organization, the user may have a duty to create a disclaimer indicating that information is used pursuant to a license.

An embodiment of the present invention may be applied to market data as well as other types of data including reference data, index data, streaming data, non-streaming data, etc. Examples of streaming data may include inter-application messaging. The examples for non-streaming data may include internal research data. An embodiment of the present invention may be applied beyond market data to similar types of entitlement systems that use ODRL. For example, ODRL may be used for customer payments, trade agreements, etc. If use of data involves an enforceable aspect, an embodiment of the present invention may be applied to check an agreement and comply with the agreement before an action is permitted.

Figure 2:
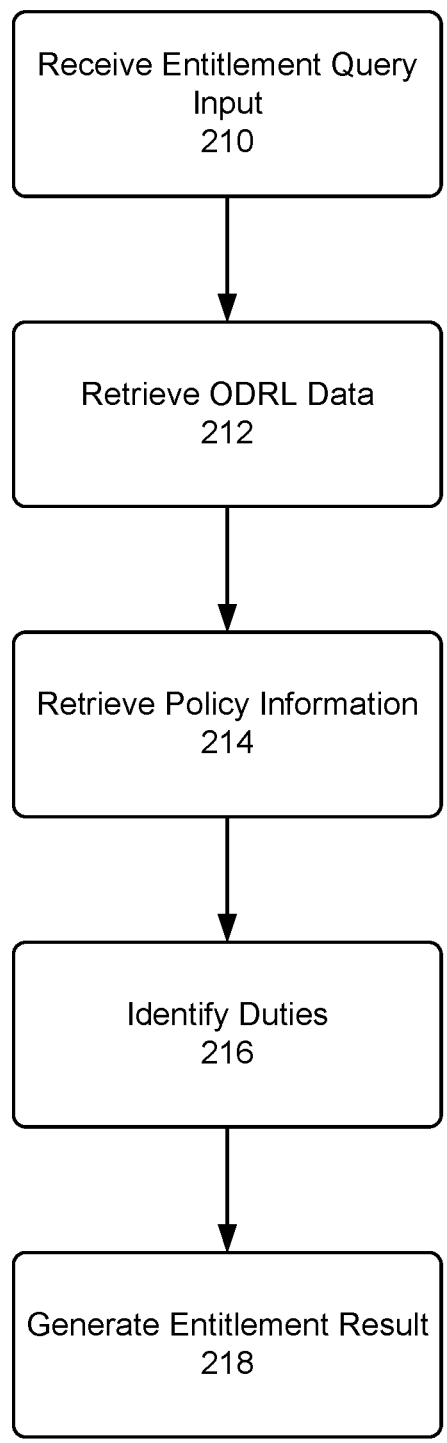
FIG. 2 is an exemplary flowchart, according to an embodiment of the present invention.

FIG. 2 is an exemplary flowchart, according to an embodiment of the present invention. At step 210, an entitlement query input may be received. At step 212, ODRL data may be retrieved. This may include market data ODRL data which may be extracted from a local source. At step

214, policy information may be retrieved. At step 216, one or more duties and/or obligations may be identified. At step 218, an entitlement result may be generated. This may be performed by a policy engine that executes an open policy agent. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements an open policy agent bridge for entitlements determination, the system comprising:
   an electronic input that interfaces with a user over a communication network;
   a first memory component that stores and manages Open Digital Rights Language (ODRL) data;
   a second memory component that stores and manages policy data; and
   a policy engine comprising a computer processor and coupled to the electronic input, the first memory and the second memory; the computer processor is further configured to perform the steps of:
      receiving, via a communication network, an entitlement query input associated with an object from a requestor wherein the object relates to a security object;
      responsive to the entitlement query input, extracting ODRL data corresponding to the object at run time;
      extracting, at run time, policy data based on digital rights management (DRM) corresponding to the object;
      generating, via the policy engine, an entitlement determination based on the ODRL data and the policy data, wherein the entitlement determination includes determinations of:
         whether the user is permitted to see data of the object,
         whether the user is permitted to control the data of the object,
         one or more prohibitions placed on the user for the object,
         one or more actions permitted by the user to perform for the object, and
         one or more duties that the user is obligated to perform in accordance with the DRM, the one or more duties including a duty to provide a disclaimer when transmitting information generated using the data of the object to an external network;
      generating an entitlements query result;
      generating a graph using the data of the object;
      transmitting, via a communication network, the entitlements query result and the graph to a recipient, the recipient residing on an external network different from that of the user;
      in response to both creating the graph and determining that the graph is transmitting to the recipient residing on the external network, informing the user a duty to create a disclaimer indicating that the data of the object is used pursuant to a license based on the one or more duties that the user is obligated to perform; and
      when the entitlement determination results in a failure, informing the user of the failure and a corresponding reason for the failure.

2. The system of claim 1, wherein the entitlement query input is in JavaScript Object Notation (JSON) format.

3. The system of claim 1, wherein the ODRL data covers market data.

4. The system of claim 1, wherein the ODRL data is in JSON or Yet Another Markup Language (YAML) format.

5. The system of claim 1, wherein the policy data relates to market data.

6. The system of claim 1, wherein the policy data is in a rights expression language.

7. The system of claim 1, wherein the entitlement determination further identifies whether the object can be used or accessed in a specified manner.

8. The system of claim 1, wherein the entitlement determination is based at least in part on corporate structure and hierarchy data.

9. A method that implements an open policy agent bridge for entitlements determination, the method comprising the steps of:
   receiving, via a communication network, an entitlement query input associated with an object from a requestor wherein the object relates to a security object;
   responsive to the entitlement query input, extracting Open Digital Rights Language (ODRL) data corresponding to the object from a first memory component;
   extracting policy data based on digital rights management (DRM) corresponding to the object from a second memory component;
   generating, via a policy engine, an entitlement determination based on the ODRL data and the policy data, wherein the entitlement determination includes determinations of:
      whether the user is permitted to see data of the object,
      whether the user is permitted to control the data of the object,
      one or more prohibitions placed on the user for the object,
      one or more actions permitted by the user to perform for the object, and
      one or more duties that the user is obligated to perform in accordance with the DRM, the one or more duties including a duty to provide a disclaimer when transmitting information generated using the data of the object to an external network;
   generating an entitlements query result;
   generating a graph using the data of the object;
   transmitting, via a communication network, the entitlements query result to a recipient, the recipient residing on an external network different from that of the user;
   in response to both creating the graph and determining that the graph is transmitting to the recipient residing on the external network, informing the user a duty to create a disclaimer indicating that the data of the object is used pursuant to a license based on the one or more duties that the user is obligated to perform; and
   when the entitlement determination results in a failure, informing the user of the failure and a corresponding reason for the failure.

10. The method of claim 9, wherein the entitlement query input is in JavaScript Object Notation (JSON) format.

11. The method of claim 9, wherein the ODRL data covers market data.

12. The method of claim 9, wherein the ODRL data is in JSON or Yet Another Markup Language (YAML) format.

13. The method of claim 9, wherein the policy data relates to market data.

14. The method of claim 9, wherein the policy data is in a rights expression language.

15. The method of claim 9, wherein the entitlement determination further identifies whether the object can be used or accessed in a specified manner.

16. The method of claim 9, wherein the entitlement determination is based at least in part on corporate structure and hierarchy data.

* * * * *